US008496463B2

(12) United States Patent  
Oravits et al.

(10) Patent No.: US 8,496,463 B2  
(45) Date of Patent: Jul. 30, 2013

(54) EXTRUDER FEED SECTION WITH PIVOTABLE FEED ROLL ASSEMBLY

(75) Inventors: Thomas J. Oravits, Durham, CT (US); Joseph A. Wnuk, Westerly, RI (US)

(73) Assignee: Davis-Standard, LLC, Pawcatuck, CT (US)

( * ) Notice: Subject to any disclaimer, the term of this patent is extended or adjusted under 35 U.S.C. 154(b) by 478 days.

(21) Appl. No.: 12/899,857

(22) Filed: Oct. 7, 2010

(65) Prior Publication Data

US 2011/0081436 A1    Apr. 7, 2011

Related U.S. Application Data

(60) Provisional application No. 61/249,456, filed on Oct. 7, 2009.

(51) Int. Cl.  
*B29C 47/10* (2006.01)

(52) U.S. Cl.  
USPC ........ 425/188; 366/76.5; 425/192 R; 425/207

(58) Field of Classification Search  
USPC ............. 425/188, 192 R, 207, 209; 366/76.5, 366/79  
See application file for complete search history.

(56) References Cited

U.S. PATENT DOCUMENTS

| 1,422,561 | A | * | 7/1922 | Gomersall | 366/76.5 |
| 4,718,770 | A | * | 1/1988 | Christy | 366/71 |
| 4,850,842 | A | * | 7/1989 | Van Alstine | 425/205 |
| 5,068,069 | A | * | 11/1991 | Capelle | 264/40.5 |

OTHER PUBLICATIONS

Kramer, William A., "Extruder Designs for Fast Product Changeovers", Aug. 7, 2008.

* cited by examiner

*Primary Examiner* — Yogendra Gupta  
*Assistant Examiner* — Joseph Leyson  
(74) *Attorney, Agent, or Firm* — Michaud-Kinney Group LLP

(57) ABSTRACT

A feed section for an extruder machine including a housing having one or more walls defining an interior area within the housing. The feed section includes a shaft mounted to one or more of the walls and a feed roll assembly disposed at least partially in the interior area and pivotally coupled to the shaft for pivotal movement of the feed roll assembly relative to the housing. The feed roll assembly includes a seat portion releasably coupled to a cap portion. The cap portion is pivotally coupled to the shaft for pivotal movement of the cap portion relative to the housing and the seat portion. The feed roll assembly includes a feed roll rotatingly mounted between the seat and cap portions for conveying material to be extruded between an inlet and outlet of the housing.

9 Claims, 7 Drawing Sheets

EXTRUDER FEED SECTION WITH PIVOTABLE FEED ROLL ASSEMBLY

CROSS-REFERENCE TO RELATED APPLICATION

This application is based upon and claims the benefit of priority from U.S. Provisional Patent Application Ser. No. 61/249,456, filed on Oct. 7, 2009; the entire contents of which are incorporated herein by reference.

TECHNICAL FIELD

The present disclosure relates generally to a feed section for an extruder machine, and more particularly, to a feed roll assembly that can pivot to a position which provides access to feed rolls and other components positioned in internal areas of the feed section.

BACKGROUND OF THE INVENTION

Screw type extruders typically include a screw positioned for rotation in an extruder barrel. The extruders generally include three zones, namely a feed zone, a melting/softening zone, and a metering zone employed in the feeding, melting/softening and forming of a material such as an elastomeric material, respectively. An interior area of the extruder barrel and the surface of the screw define a channel therebetween through which the elastomeric material introduced to the feed zone is conveyed. Axial rotation of the screw causes the elastomeric material to be conveyed successively through the feed, melting/softening and metering zones. A shaping die is positioned on a discharge end of the extruder, adjacent to the metering zone for extruding the elastomeric material into a particular cross sectional configuration.

The feed zone typically includes a hopper extending therefrom and having an opening for introduction of the elastomeric materials into the hopper. The hopper has a bore extending therethrough and into which a portion of the screw extends. A drive mechanism is mounted to one side of the hopper and is rotatably coupled to the screw. In addition, a feed roll is positioned on a mounting frame in the hopper and is rotatably coupled to the drive mechanism. The feed roll rotates in a direction counter to the rotation of the extruder screw and creates a roll nip that pinches and impinges the elastomeric material into the feed zone of the screw. The screw then conveys the elastomeric material through the channel for extrusion through the shaping die.

During operation, the elastomeric material is caused to soften in the feed zone and progressively softens during conveyance through the channel. If operation of the extruder is interrupted while the softened elastomeric material is present in the hopper, the material could harden on the feed rolls and adjacent areas. Typically, a labor intensive disassembly is required to clean the hardened material from the feed rolls and the adjacent areas.

SUMMARY OF THE INVENTION

According to aspects illustrated herein, there is provided a feed section for an extruder machine including a housing having one or more walls defining an interior area within the housing. The feed section includes a first shaft mounted to one or more of the walls. In addition, the feed section includes a feed roll assembly disposed at least partially in the interior area and pivotally coupled to the first shaft for allowing pivotal movement of the feed roll assembly relative to the housing. The feed roll assembly includes a seat portion releasably coupled to a cap portion. The cap portion is pivotally coupled to the first shaft for permitting pivotal movement of the cap portion relative to the housing and the seat portion. The feed roll assembly includes a feed roll rotatingly mounted between the seat and cap portions for conveying material to be extruded between an inlet and outlet of the housing.

According to other aspects illustrated herein, a second shaft is releasably secured to the seat and cap portions and the feed roll is mounted on the second shaft between the seat portion and the cap portion. In one embodiment, a portion of the second shaft is operably coupled to a drive unit for causing axial rotation of the second shaft and the feed roll. The drive unit is located adjacent to the feed roll assembly.

According to other aspects illustrated herein, a portion of the feed roll assembly is pivotable to a position outside of the interior area of the housing, for providing access to the interior area for maintenance, inspection and the like. In one embodiment, the second shaft is disengaged from the drive unit when the portion of the feed roll assembly is pivoted to the position outside of the interior area of the housing.

According to other aspects illustrated herein, an actuator is operably coupled to the feed roll assembly for causing the feed roll assembly to pivot about the first shaft.

The above described and other features are illustrated by the following figures and detailed description.

BRIEF DESCRIPTION OF THE DRAWINGS

Referring now to the Figures, which are exemplary embodiments, and wherein the like elements are numbered alike.

DETAILED DESCRIPTION OF PREFERRED EMBODIMENTS

Figure 1:
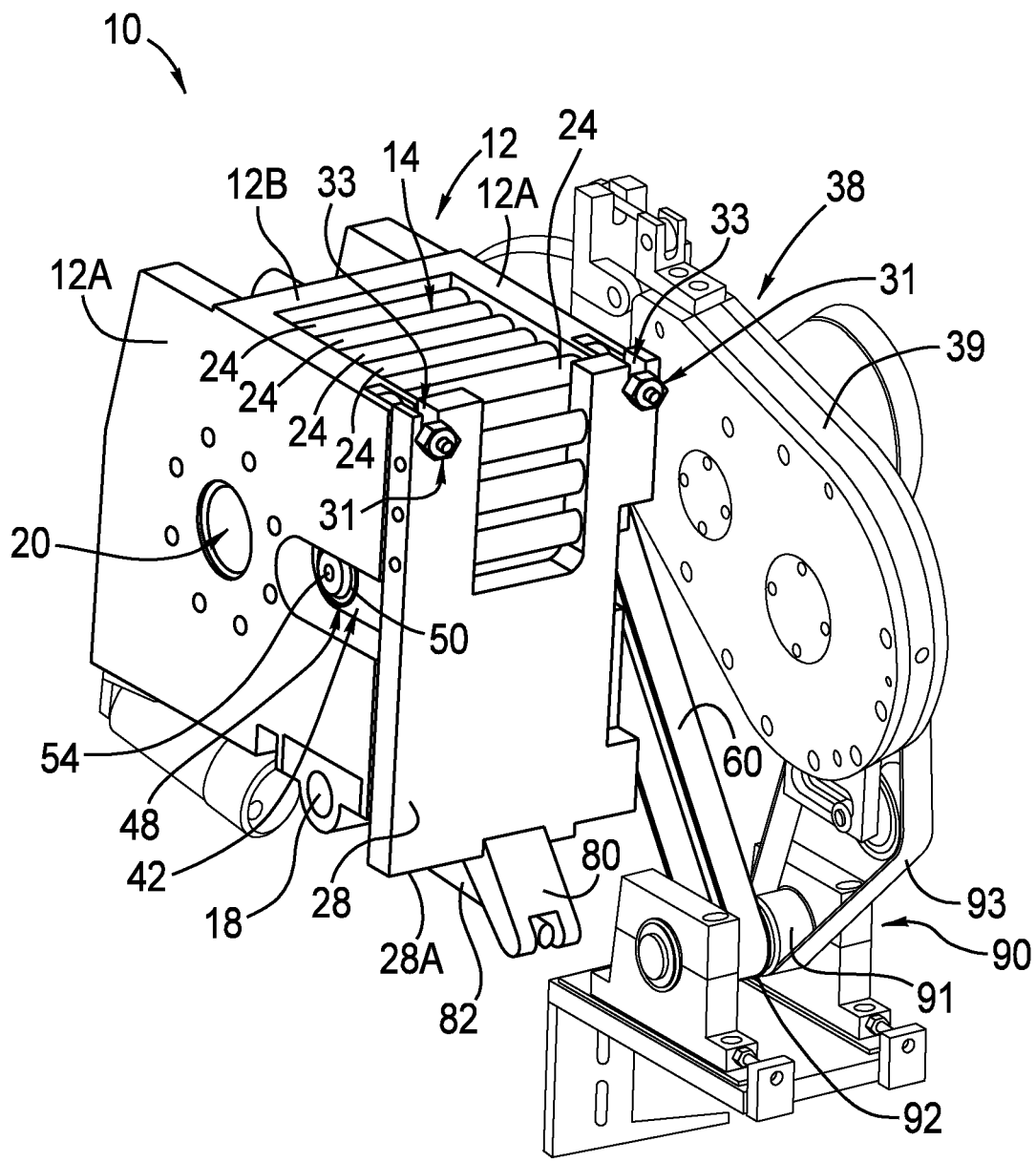
FIG. 1 is a perspective view of a feed section of an extruder machine in a closed state.
Figure 2:
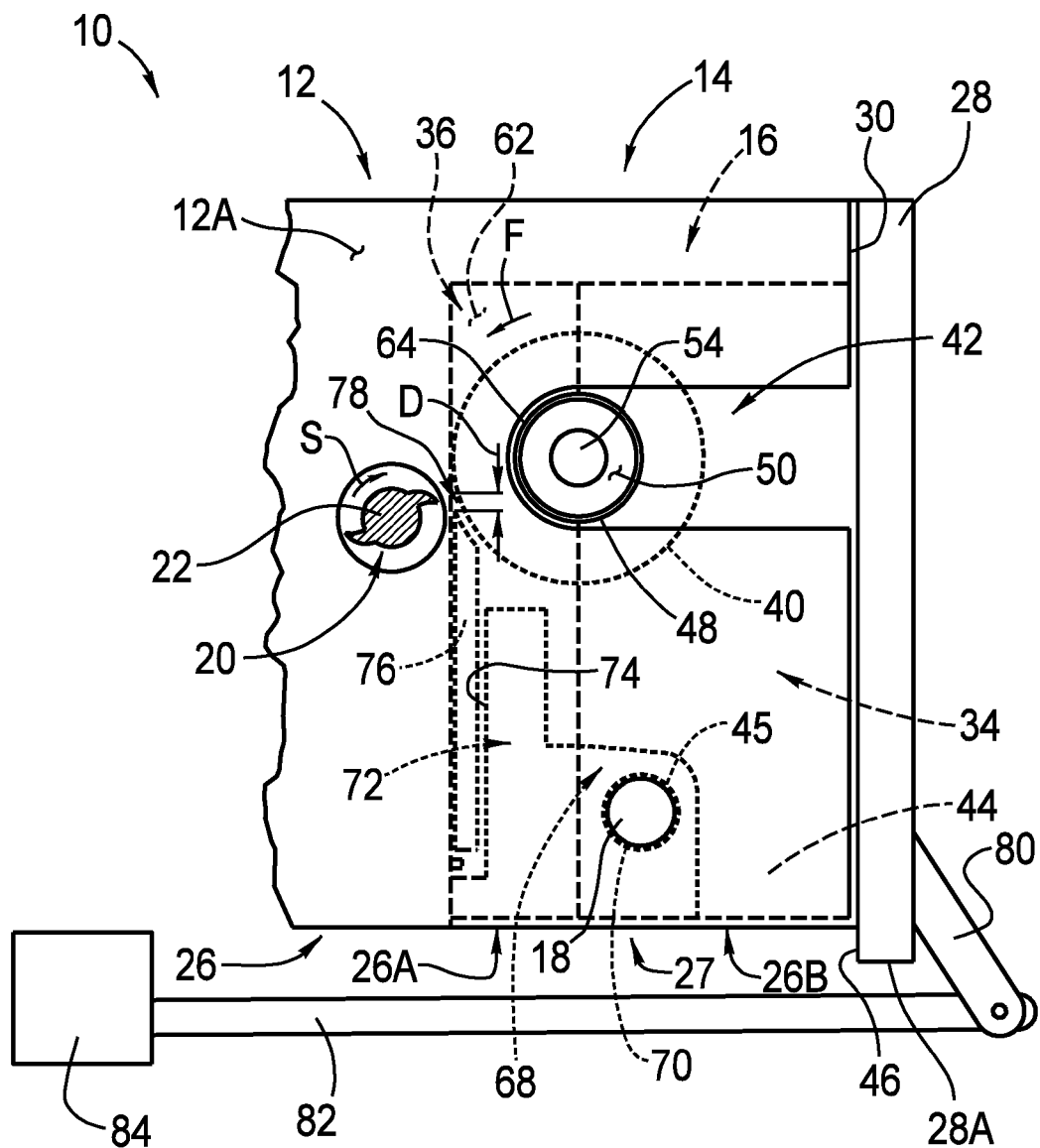
FIG. 2 is a cross sectional view of a portion of the feed section of FIG. 1.

As shown in FIGS. 1 and 2, a feed section 10 for an extruder machine includes a generally box shaped housing 12 defining an upwardly facing opening or inlet 14 for receiving a material to be extruded such as elastomeric strips. A feed roll assembly 16 is pivotally mounted on a shaft 18 secured to the housing 12. The feed roll assembly 16 is pivotable on the shaft 18, relative to the housing 12, as described below. In addition the housing 12 includes a bore 20 extending therethrough for receiving a feed end of an extruder screw 22, as shown in FIG. 2. The bore 20 also provides an outlet for communication with the extruder machine and for discharging the material therethrough.

The feed roll assembly 16 and the extruder screw 22 cooperate to convey the elastomeric strips from the inlet to the outlet for further processing in the extruder machine. As described below, a portion of the feed roll assembly 16 can be pivoted from a closed position to a position outside of the» housing 12, to provide access to an interior area of the housing for maintenance, inspection, adjustment and cleaning. Although the housing 12 is described as being generally boxed shaped, the present invention is not limited in this regard as housings of any configuration can be employed including but not limited to cylindrical, semi-spherical and rhomboid configurations.

Referring to FIGS. 1 and 2, the opening 14 is shown having a plurality of spaced apart rollers 24 extending thereacross for assisting with the transport of the elastomeric strips into the interior area defined by the housing 12. The rollers 24 also limit access into the interior area for operator safety. The housing 12 is defined by opposing side walls 12A coupled together by a rear wall 12B disposed therebetween. The housing 12 includes a base 26 extending between and sealing a bottom portion 27 of the housing, during operation. As described below, portions 26A, 26B of the base 26 pivot with the feed roll assembly 16, relative to the housing and relative to each other. While the opening 14 is shown and described as having a plurality of spaced apart rollers 24 extending thereacross, the present invention is not limited in this regard as other configurations can be employed including but not limited to the use of grates or an unobstructed opening.

Referring to FIGS. 1 and 2, the bore 20 extends through both side walls 12A. The bore 20 receives the extruder screw 22, as shown in FIG. 2. A distal end (not shown) of the extruder screw 22 engages a gear reducer (not shown) which imparts axial rotation to the extruder screw. Other portions of the extruder screw 22 extend outwardly from the feed section 10 and are housed in a barrel (not shown) which can be secured to the side wall 12A opposite the drive unit 38. While the gear reducer is described as engaging and imparting axial rotation to the extruder screw, other means of imparting axial rotation can be employed, including but not limited to direct drive motors, variable speed motors and belt drives, without departing from the broader aspects disclosed herein.

Referring to FIGS. 1 and 2, the feed roll assembly 16 defines an end wall 28 which, in a closed position, overlaps end portions 30 of the side walls 12A opposite the end wall 12B. In the closed position, the end wall 28 is held against the end portions 30; and the feed roll assembly 16 is secured into the housing 14 by threaded fasteners 31, which can be swung into or out of respective engaging slots 33 formed in the end wall 28, as shown in FIGS. 1, 3 and 6.

Referring to FIGS. 2-4 and 6, the feed roll assembly 16 includes a bearing seat 34 and a bearing cap 36 which cooperate with one another to rotatably support a feed roll 40 therebetween. The bearing seat 34 defines two mounting plates 44 extending generally perpendicularly from and secured to peripheral inside surfaces 46 of the end wall 28. The mounting plates 44 are joined together at one end by the base portion 26B. The feed roll assembly 16 is pivotally mounted on the shaft 18. The shaft 18 extends between the side walls 12A and passes through bores 45 extending through each of the mounting plates 44.

Each of the mounting plates 44 includes a semi-circular opening 48 formed therein for receiving a bearing 50. The feed roll 40 is disposed between the mounting plates 44 and is secured to a shaft 54. In addition, the bearings 50 are mounted on the shaft 54 at each of two areas, adjacent to opposing ends of the shaft, for supporting axial rotation of the shaft relative to the mounting plates 44.

Figure 3:
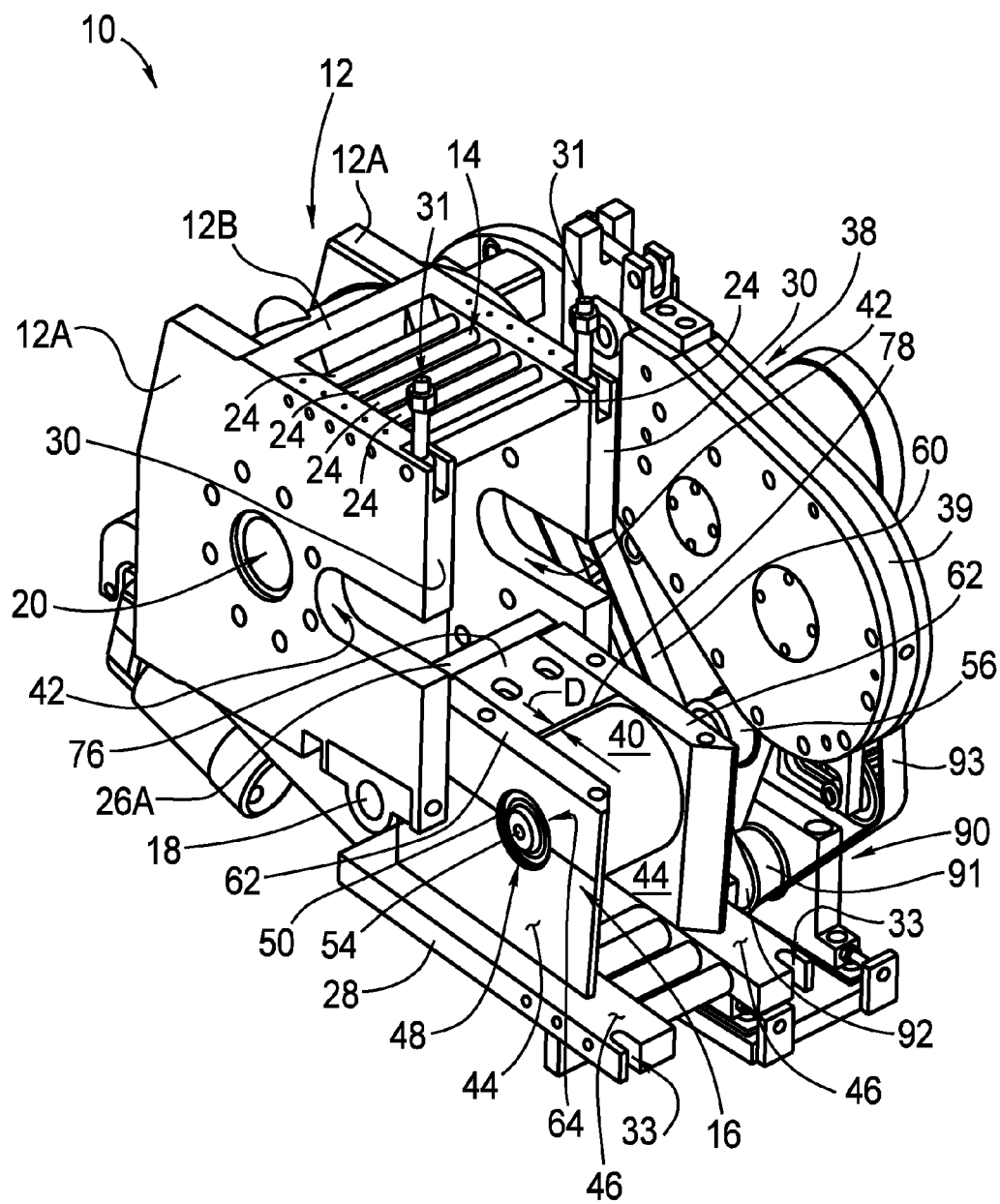
FIG. 3 is a perspective view of the feed section of FIG. 1 in an open state.
Figure 6:
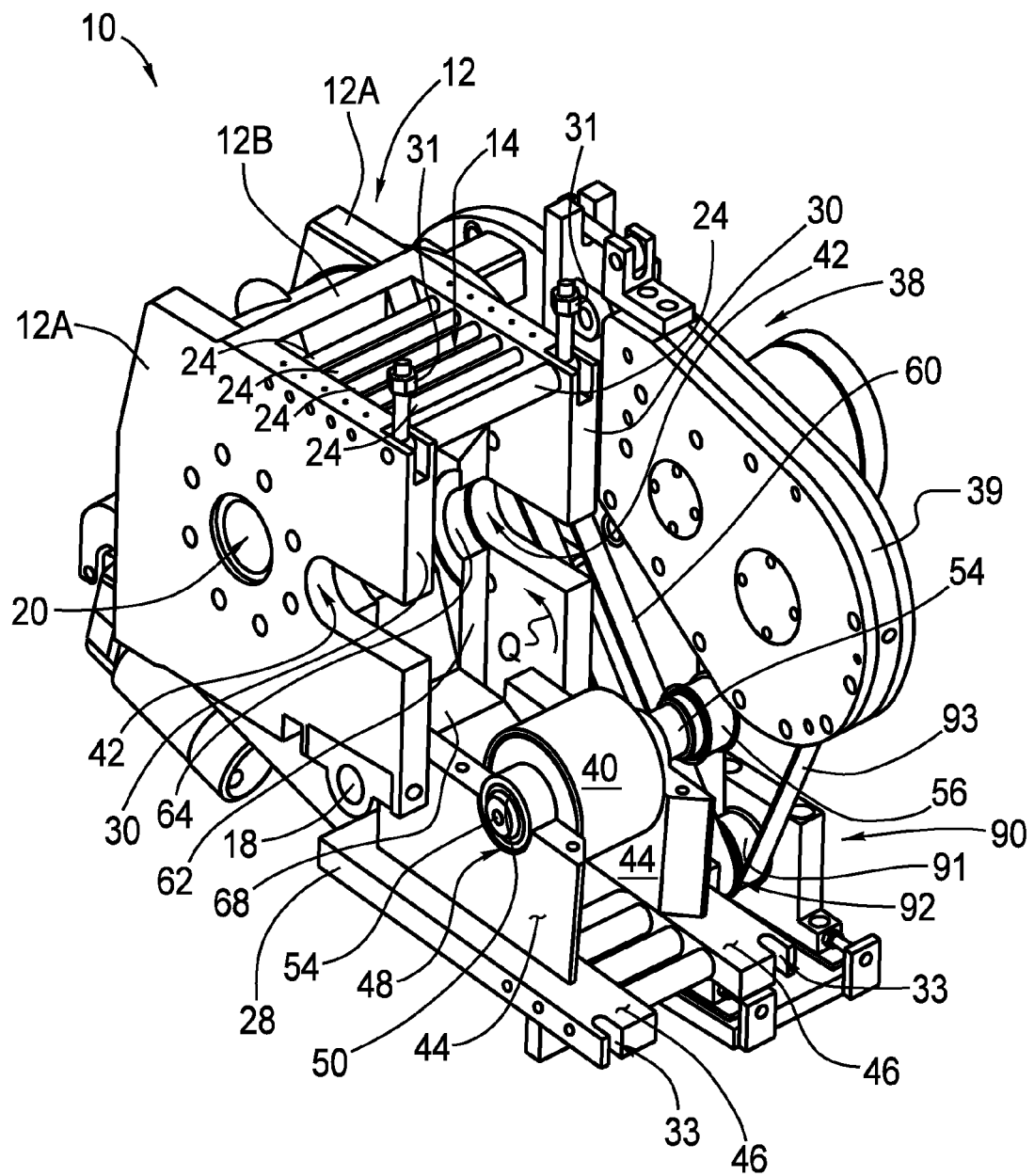
FIG. 6 is a perspective view of the feed section of FIG. 3 with a bearing cap disengaged.

Referring to FIGS. 1, 3 and 6, a drive unit 38 is in operable communication with the feed roll assembly 16 for imparting axial rotation on the feed roll 40. The drive unit 38 is positioned adjacent to the feed roll assembly 16, for ease in engaging and disengaging the drive unit and the feed roll assembly from one another, as described below. The drive unit 38 is coupled to a portion (not shown) of the extruder screw, which powers the drive unit. The extruder screw 22 includes a sheave (not shown) mounted thereon which is coupled to a gear reducer 39 by a drive belt (not shown). The drive unit 38 also includes an idler unit 90 which has a timing sheave 91 and a drive sheave 92 mounted thereon. The gear reducer 39 is coupled to the timing sheave 91 by a timing belt 93 which drives both the timing sheave and the drive sheave 92. One end of the shaft 54, adjacent to the drive unit 38, includes a sheave 56. The sheave 56 engages a drive belt 60 which is driven by the drive sheave 92 for imparting axial rotation to the shaft 54 and the feed roll 40. Having the drive unit 38 positioned adjacent to the feed roll assembly 16 has utility in providing ease of engagement and disengagement between the drive belt 60 and the sheave 56, for example, during assembly and disassembly, as described below.

Referring to FIGS. 1-7, the bearing cap 36 is pivotally coupled to the housing 12 and the bearing seat 34. The bearing cap 36 is defined by a pair of opposing support walls 62 secured to one another by the base portion 26A. Each of the support walls 62 include a semi-circular opening 64 formed therein for securing the bearing 50 thereto. The semi-circular opening 48 of the mounting plates 44 and the semi-circular openings 64 of the support walls 62 are aligned with one another. In addition, each of the mounting plates 44 are removably secured to one of the support walls 62 with suitable fasteners (not shown).

The base portion 26A of the support wall 62 includes a support arm 68 which extends from the base portion and into an area between the mounting plates 44. The support arm 68 includes a bore 70 extending therethrough. The shaft 18 extends through the bore 70, thereby pivotally supporting the bearing cap 36, for pivotal movement thereof, relative to both the housing 12 and the bearing seat 34. Although the bearing seat 34 and bearing cap 36 are shown and described as having semi-circular openings 48, 64, respectively, the present invention is not limited in this regard as, other configurations can be employed, including but not limited to tapered openings, square openings and openings having grooves.

Each of the side walls 12A includes a U-shaped opening 42 extending therethrough and terminating at the end portion 30 of the side walls 12A. The U-shaped openings 42 provide clearance for portions of the shaft 54 and bearing 50 which protrude beyond the mounting plates 44 and support walls 62, for example, when a portion of the feed roll assembly 16 is swung into the housing 12. While the opening 42 is shown and described as being U-shaped, openings or recesses of any configuration suitable to provide clearance for the shaft 54 and bearing 50 may be employed.

Figure 4:
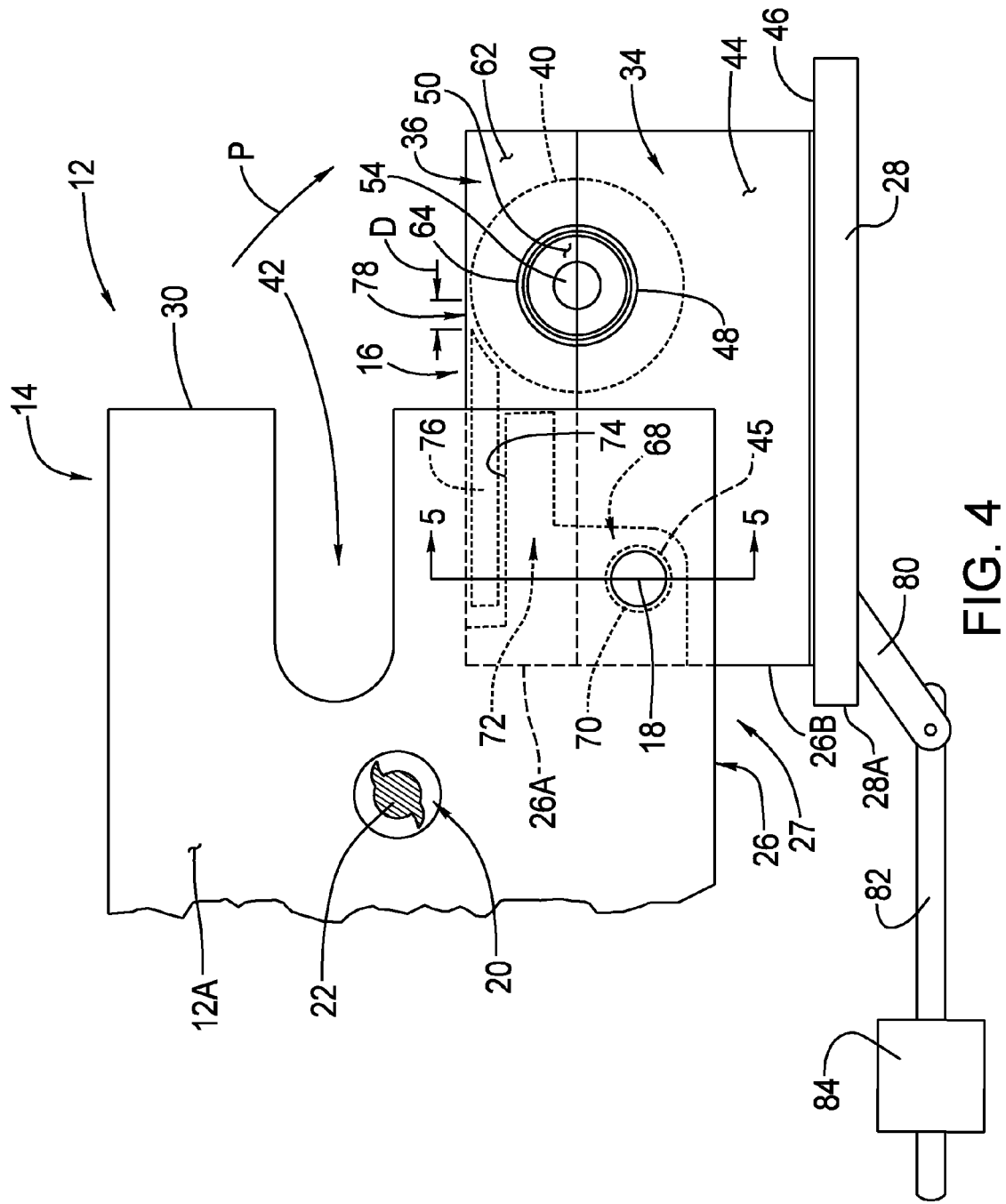
FIG. 4 is a cross sectional view of a portion of the feed section of FIG. 3.
Figure 5:
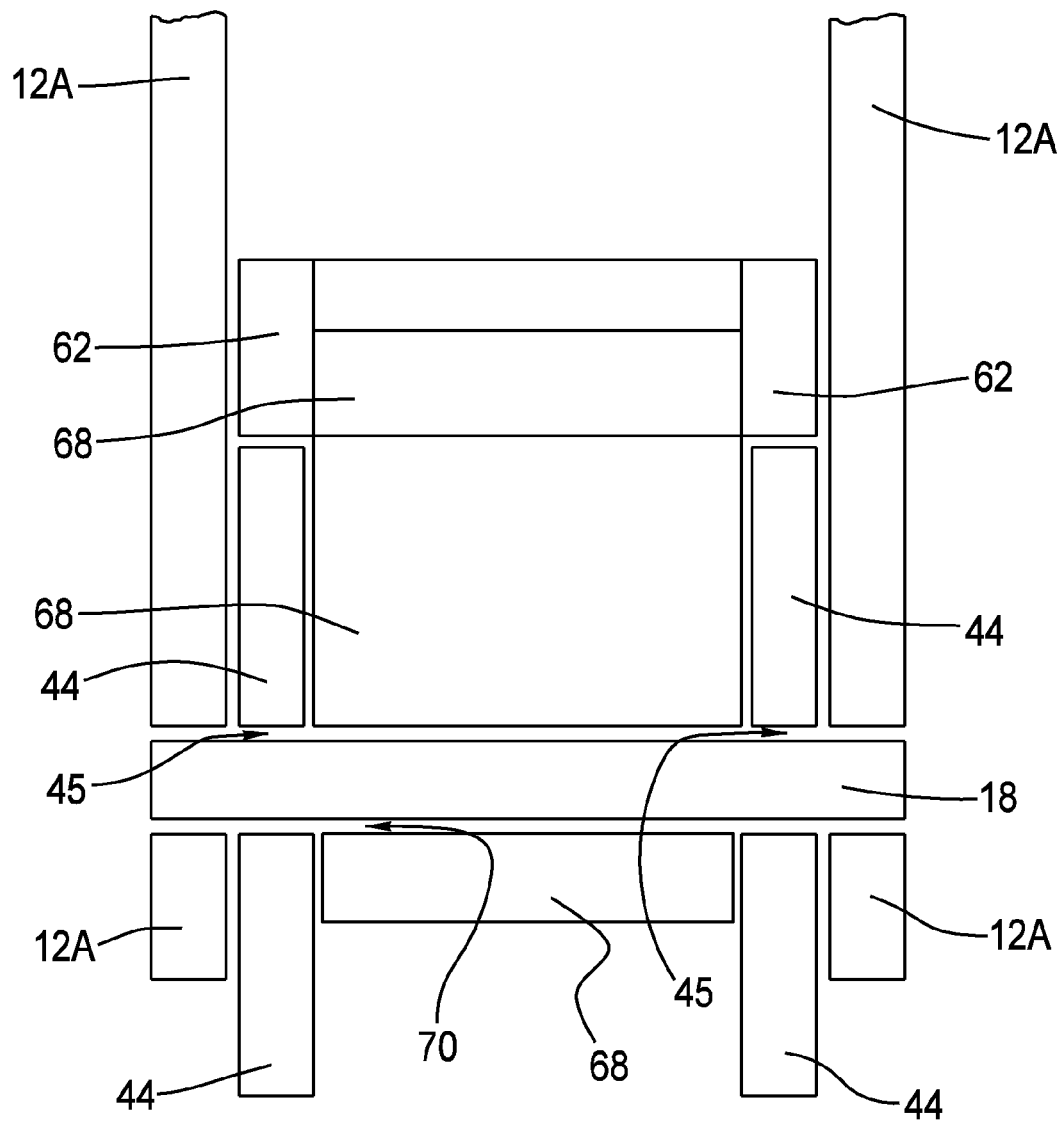
FIG. 5 is a cross sectional detailed view of a portion of the feed section of FIG. 4.

Referring to FIGS. 2-4, the base portion 26A also defines a support section 72 extending substantially perpendicularly therefrom. The support section 72 has a mounting surface 74 formed thereon for removably mounting a scraper 76 thereto. The scraper 76 includes a beveled end 78 which is positioned proximate the feed roll 40 and spaced apart therefrom by a distance D. The distance D can be adjusted by positioning the scraper 76 in a suitable position on the mounting surface 74 and securing the scraper thereto with appropriate fasteners (not shown). The scraper 76 has utility in removing residual softened elastomeric material from the feed roll 40 thereby maximizing the amount of the elastomeric material fed to the screw 22 and then exiting the feed section 10 through the bore 20.

Referring to FIGS. 1, 2, 4 and 7, the end wall 28 includes a lug 80 extending outwardly therefrom and beyond an end 28A of the end wall. One end of a linkage member 82 is pivotally coupled to the lug 80. Other portions of the linkage member 82 are operably coupled to an actuator 84, such as a motor, for causing the feed roll assembly 16 to pivot open in the direction indicated by the arrow P in FIG. 4 and closed as shown in FIG. 1. Although the linkage member 82 and the motor actuator 84 is described, the present invention is not limited in this regard as other configurations may be employed including but not limited to direct drive actuators, pneumatic actuators, actuators using rack and pinion mechanisms and manually operated mechanisms.

FIGS. 1 and 2 illustrate the feed section 10 configured for operation, with a portion of the feed roll assembly 16 inserted into the housing 12 and the sheave 56 engaging and tensioning the drive belt 60. The fasteners 31 are engaged in the slot 33 and tightened accordingly. During operation, the elastomeric strips are introduced into the opening 14 of the feed section 10 with the assistance of a suitable hopper (not shown). The drive unit 38 causes axial rotation of the feed roll 40 in a direction shown by the arrow F and causes axial rotation of the screw 22 in an opposite direction, as depicted by arrow S. Such rotation of the feed roll 40 and screw 22 causes the elastomeric strips to be drawn into the bore 20 and the barrel of the extruder machine. The elastomeric strips begin to soften in the feed section 10 with the addition of heat. The bevel portion 78 of the scraper 76 removes residual softened elastomeric material from the rotating feed roll 40.

If operation of the feed section 10 is interrupted while softened elastomeric material is present therein, the elastomeric material can harden on the feed roll 40 and adjacent areas and clog the feed section. If the housing 12 needs to be accessed, the fasteners 31 can be loosened and swung out of the slots 33. A portion of the feed roll assembly 16 is pivoted outwardly in the direction shown by the arrow P to a position outside the housing 12, for example, by activation of the actuator 84. Such pivoting of the feed roll assembly 16 causes the shaft 54 and portions of the bearing 50 to travel unobstructed in the U-shaped openings 42 thereby disengaging the sheave 56 from the drive belt 60 by causing the drive belt to become slack.

Residual elastomeric material can be cleaned from the feed roll 40, scraper 76 and internal areas of the housing 12 while the feed roll assembly 16 is pivoted outwardly as shown in FIGS. 3, 4, 6 and 7. While the portion of the feed roll assembly 16 is pivoted to the position outside the housing 12, the scraper 74 is accessible for adjustments, such as for setting the distance D between the bevel 78 and the feed roll 40. Pivoting of the feed roll assembly 16 outwardly from the housing 12 reduces the complexity of disassembly of the feed section 10. In addition, downtime of the extruder machine associated with maintenance, inspection, cleaning and adjustment of the feed section 10 is also reduced.

Figure 7:
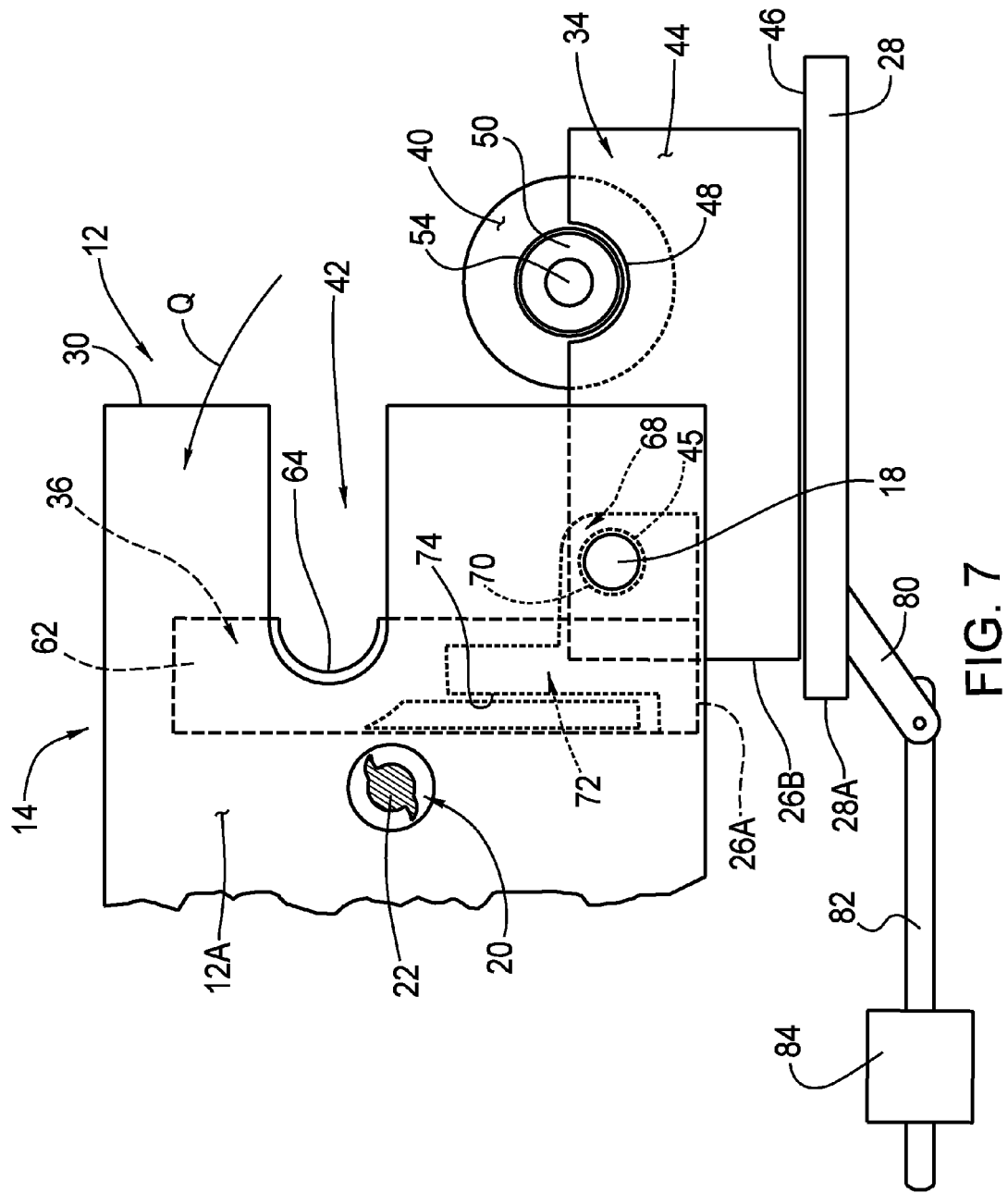
FIG. 7 is a cross sectional view of the feed section of FIG. 6.

In addition, the bearing cap 36 can be pivoted off of and away from the bearing seat 34 in the direction indicated by the arrow Q in FIGS. 6 and 7 and back into the housing 12. The pivoting of the bearing cap 36 back into the housing 12 is accomplished with the feed roll assembly 16 in the outwardly extended position (FIGS. 3 and 4), after the bearing cap is released from the bearing seat 34 by removal of the fasteners extending therebetween. Such pivoting of the bearing cap 36 back into the housing 12 facilitates disassembly, maintenance and cleaning of the bearing 50 and feed roll 40 and reduces downtime of the extruder machine.

Reassembly, of the feed section 10 can be accomplished by swinging the bearing cap 36 back into position on the bearing seat 34; securing the bearing cap to the bearing seat; swinging the portion of the feed roll assembly 16 back into the housing 12; and securing the end wall 28 to the housing by swinging the fasteners 31 into the slots 33; and tightening the fasteners accordingly.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A feed section for an extruder machine comprising:
   a housing having at least one wall defining an interior area within said housing, said housing having an inlet and an outlet;
   a first shaft mounted to said at least one wall;
   a feed roll assembly disposed at least partially in said interior area and pivotally coupled to said first shaft for pivotal movement of said feed roll assembly relative to said housing,
   said feed roll assembly comprising
   a seat portion releasably coupled to a cap portion,
   said cap portion being pivotally coupled to said first shaft for pivotal movement of said cap portion relative to said housing and said seat portion; and
   a feed roll rotatingly mounted between said seat and cap portions for conveying material between said inlet and said outlet.

2. The feed section of claim 1, comprising a second shaft releasably secured to said seat and cap portions and wherein said feed roll is mounted on said second shaft between said seat portion and said cap portion.

3. The feed section of claim 2, wherein a portion of said second shaft is operably coupled to a drive unit for causing axial rotation of said second shaft and said feed roll.

4. The feed section of claim 3, wherein said second shaft is disengaged from said drive unit when a portion of said feed roll assembly is pivoted to a position outside of said interior area.

5. The feed section of claim 1, wherein a portion of said feed roll assembly is pivotable to a position outside of said interior area, for providing access to said interior area.

6. The feed section of claim 1, wherein said cap portion is disengaged from said feed roll when said cap portion is pivoted away from said seat portion and wherein said seat portion releasably holds said feed roll.

7. The feed section of claim 1, wherein:
   said seat portion comprises opposing side walls having a first bore extending therethrough;
   said cap portion comprises a support arm extending therefrom, said support arm extending between said opposing side walls and having a second bore extending therethrough; and
   said first shaft extending through said first and second bores.

8. The feed section of claim 1, comprising an actuator operably coupled to said feed roll assembly for causing said feed roll assembly to pivot about said first shaft.

9. The feed section of claim 3, wherein said drive unit is disposed adjacent to said feed roll assembly.

* * * * *